UNITED STATES PATENT OFFICE.

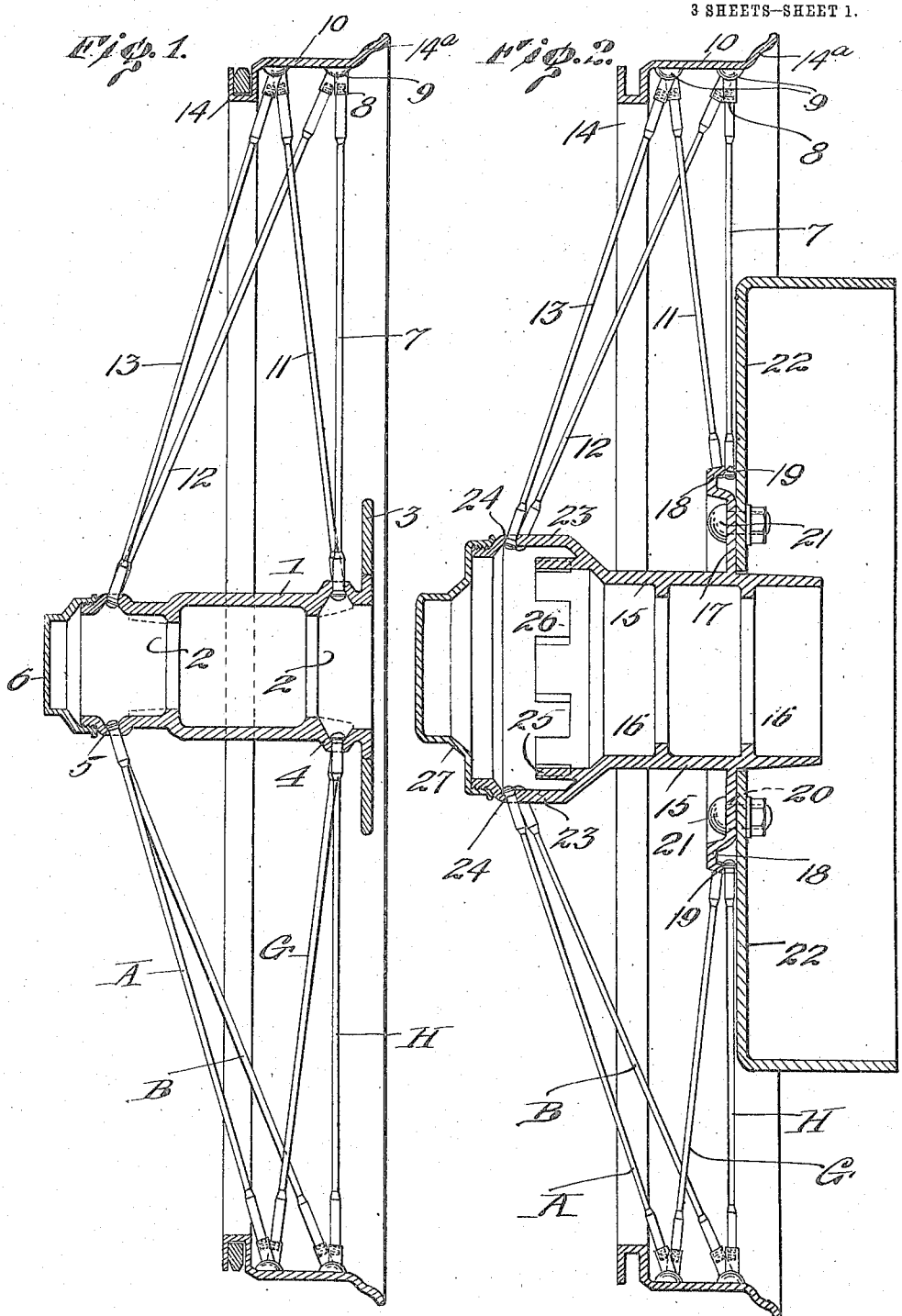

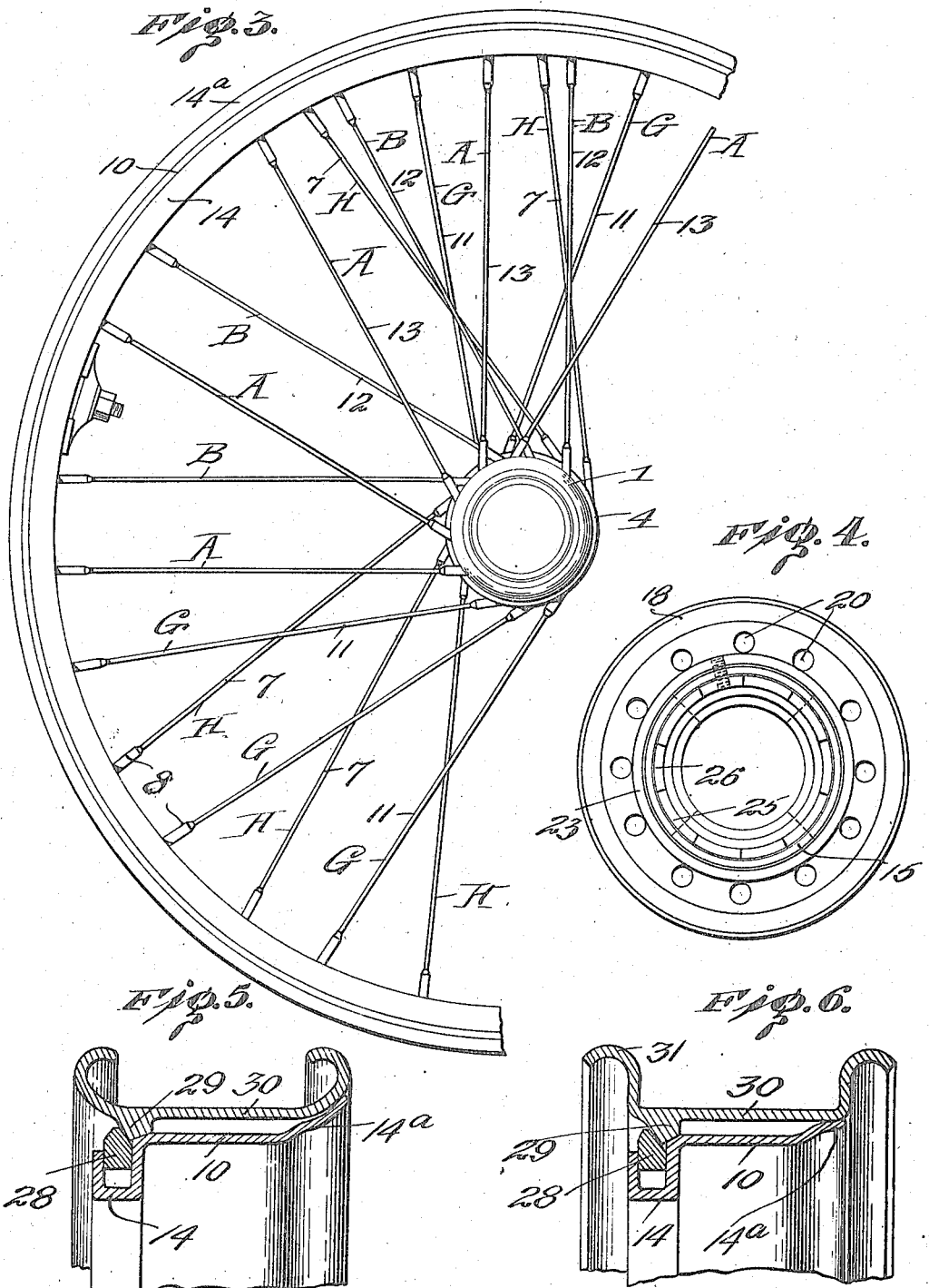

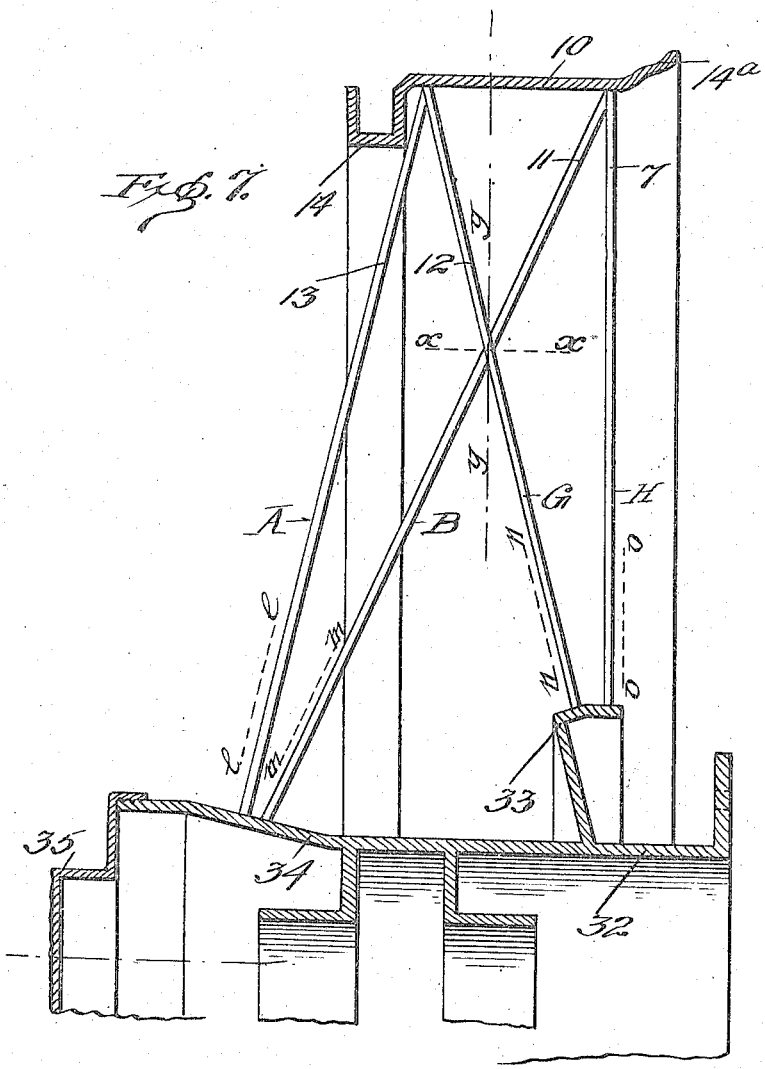

ROBERT W. ASHLEY AND FRANK OBERKIRCH, OF NEW YORK, N. Y., ASSIGNORS TO GENERAL RIM COMPANY, A CORPORATION OF NEW YORK.

WIRE WHEEL.

1,135,424.      Specification of Letters Patent.      Patented Apr. 13, 1915.

Application filed August 1, 1913. Serial No. 782,396.

*To all whom it may concern:*

Be it known that we, ROBERT W. ASHLEY and FRANK OBERKIRCH, citizens of the United States, and residents of New York city, in the county of New York and State of New York, have invented certain new and useful Improvements in Wire Wheels, of which the following is a specification.

The invention relates to improvements in wire wheels and has particular reference to a wire wheel of the type provided with a series of interlaced wire spokes under tension, the wheel rim thereof being so formed as to constitute a wheel felly band as well as a demountable rim supporting member. By constructing a wire wheel in the manner as is hereinafter described it is found that the wheel felly or demountable rim supporting base will take diverse types of demountable rims comprising the individual straight side type of rim, the individual clencher bead type of rim and the universal reversible flanged type of rim.

The object of the invention is the providing of a wheel rim felly, and a standard bearing hub having suspended under tension between said rim and hub in separate alinement four series of spokes in four different positions, namely, first, from the rear of the hub to the rear of the rim, (the vertical or right angle series), second, from the rear of the hub to approximately the front of the rim, (the obtuse series of spokes), third, from approximately the rear of the rim to the front of the hub, (one of the acute series of spokes oppositely opposed to the obtuse series of spokes), the second and third series of spokes crossing one another at a point substantially on a plane with the center tread line of the wheel, and fourth, from the front of the rim to the front of the hub (the secondary acute series of spokes of a lesser inclination than the first mentioned acute series of spokes). By stringing a wire wheel in this manner the first or vertical series of spokes takes care of the vertical and driving thrust, the second or obtuse series takes care of the outward transverse thrust and assists said first series of spokes in taking care of the weight sustaining and traction sustaining forces, the third series or first mentioned acute series of spokes takes care of the inward transverse thrust assisting the obtuse series of spokes in that these intermediate series of spokes are oppositely opposed in their diagonally inclined planes, and the fourth or lesser acute series of spokes takes care of a substantial portion of bearing, outward and inward transverse thrust, as well as assisting in all the other positions the first, second and third series of spokes. By setting up a wheel of this type under tension a satisfactory, reliable, light and durable suspension wheel is had, the result being the reduction to form and practice of a true and correct four point suspension wheel.

Another object of the invention is the providing of a hub designed to take the standard bearing spindles and sleeves having cast integrally therewith a flange adapted to have mounted therein two separate series of spokes, and a reception head adapted to receive driving means forming part of a driving axle, the body of said hub being arranged to take the other or remaining series of spokes. The type and manner of stringing the spokes comprised in the structure disclosed herein may be mounted between a demountable rim and a hub shell so that it may be utilized in connection with either the demountable rim type of structure or it may be utilized in a structure wherein the wheel in its entirety is demountable.

Another and further object of the invention is the providing of a wheel felly rim reinforced on both of its edges so that the same may be constructed of a light body of steel, such reinforcement being so arranged as to take means for receiving and locking thereto a demountable rim of any type carrying means to also take any type of cushion or pneumatic tires. The hub structure is so arranged that the spoke supporting flange may be readily bolted to the brake drum of a motor car, (wherein the rear wheel structure is used, the front wheel hub structure being also of a standard type) obviating the necessity of changing any of the standard parts on a motor car when one is desirous of changing from a wooden or artillery wheel type of equipment to the wire wheel type of equipment.

In the following is described, in connection with the accompanying drawings, the embodiment of the invention the features thereof, being more particularly pointed out hereinafter in the claims.

In the drawings Figure 1. is a vertical sectional view of the front wheel type of structure illustrating the position of the four point spoke suspension wherein the four series of spokes are mounted in two lines of contact on both the hub and rim; Fig. 2. is a vertical sectional view of the rear wheel structure illustrating the manner in which the four series of spokes are mounted in four lines of contact on the hub and two lines of contact on the rim and also the means of attaching the structure as a whole to the brake drum, forming part of a motor vehicle; Fig. 3. is a side elevation partly in diagrammatical illustration of the wheel showing the type of suspension spoke interlacing; Fig. 4. is a face elevation of the rear hub structure; Fig. 5. is a cross section of the wheel felly rim illustrating in connection therewith the position a clencher type of demountable rims assumes thereon; Fig. 6. is a further cross section of the wheel felly rim illustrating the straight side type of demountable rim thereon and Fig. 7. is a diagrammatical illustration of a standard hub structure illustrating the manner in which the four series of spokes are supported thereon, the lines of support being substantially at right angles thereto, and furthermore approximately at right angles to the exact position of the obtuse and acute series of spokes.

Similar numerals of reference indicate similar parts throughout the several views.

In drawings (1) indicates the hub of the front wheel type of structure provided internally thereof with bearing shell cavities (2) and at its rear edge with a circular flange (3) which is so arranged as to take a speedometer sprocket of any type. The shell portion of hub (1) at the rear thereof is provided with a raised beading (4) and at the front edge with a similar bead (5), the extreme outer edge of said hub being externally threaded to take a suitable hub cap (6). Beading (4) has formed therein in a single alinement a series of holes adapted to take the vertical or right angle series of spokes (7) (series H.) the upper ends of said series of spokes (7) being provided with suitable nipples (8) and mounted in cups (9) on wheel felly rim (10). Said series of spokes (7) need not be set at a deflecting right angle, but they may be set or dished either into an acute or an obtuse angle, as in some instances the width of the hub (1) necessitates the dishing of said series of spokes.

(11) designates the second or obtuse series of spokes mounted in beading (4) of hub (1) in alinement with the series of spokes (7), whence they project from the back portion of said hub to approximately the forward portion of rim (10) wherein they are adjustably mounted in the same manner as series (7) (obtuse series G).

(12) indicates an acute series of spokes mounted from the forward portion of the hub in single alinement to the back of rim (10) in the same alinement as the series of spokes (12), (acute series of spokes B). Said series of spokes (12) described, (acute series B.) cross the series of spokes (11) on approximately the tread center line of the wheel and in weight and force resistance are oppositely opposed to said spokes series (11).

(13) designates a series of acute spokes strung from the forward portion of the hub in the same alinement as the series of spokes (12) to approximately the forward portion of the rim (10) in the same alinement at the rim point as the series of spokes (11), said series of spokes (13) (acute series of spokes A.) are of a lesser acute angle than of the series of spokes (12). The series of spokes (7) takes care of the vertical or driving thrust and series of spokes 11 takes care of the outward transverse thrust assisted by the series of spokes (12) to which they are oppositely opposed, which takes care of the inward transverse thrust, which assists and equalizes the distribution of the verticle and both inward and outward transverse thrusts, and the series of spokes (13) takes care of the bearing thrust as well as assisting in equalizing the forces upon all of the aforementioned series of spokes.

Rim (10) has formed on one edge a depending channel (14) for reinforcing same at that point and on its back edge a reception beading (14ª) for reinforcing that edge, thereby permitting a wheel felly rim for heavy types of cars to be constructed out of comparatively a light sheet steel, thereby providing a wheel that is light in its superstructure and one that will actually increase the life of a tire used upon it, as the life of a tire used upon a wire wheel of this type is due to the absorption of shock on the suspension tension means in the wheel itself, rather than any appreciable decrease in the weight of the wheel at its periphery thereof, which is the rim, the result obtained being that the wheel may be provided with a substantial and heavy rim rather than a type of a wheel which has heretofore had in it the main object of reducing the weight of a wheel at said periphery.

With reference to Fig. 2. of the drawings, hub (15) is made in one piece and has formed therein bearing reception cavity (16) and at its back portion a flange (17) provided with a circular channel (18) having cut therein two lines of apertures (19) and a series of holes (20) adapted to receive bolts (21) for fastening the hub structure in its entirety to brake drum (22). The forward end of hub (15) has formed therewith a sleeve (23) which has cut therein a plurality of apertures (24) in two separate lines and associated with said sleeve a reception head or sleeve (25) provided with driving dog head reception grooves (26), the outer end of shell (23) being externally threaded to take a suitable hub cap (27). Series of spokes (7) (vertical series H) are mounted in one series of apertures (19) in circular bead (18) and extend therefrom to the rear of rim (10), spoke series (11) are mounted in the other line of apertures (19) in bead (18) and extend therefrom to the forward portion of rim (10), (obtuse spokes series G). Series of spokes (12) extend from one line of apertures (24) in shell (23), which is the forward portion of the hub, to the back of rim (10) in the same alinement with the series of spokes (7), (acute spokes series B. oppositely opposed to obtuse series spokes G. and crossing one another at approximately the tread center line of the wheel rim). Series of spokes (13), (acute spokes series A.) extend from the other line of holes (24) in sleeve (23) or the forward portion of the hub, to approximately the forward portion of rim (10) in alinement with the series of spokes (11), said series of spokes (13) being at a lesser acute angle than said series of spokes (12).

With reference to Figs. 5. and 6. of the drawings the structure as illustrated in Fig. 5. shows the wheel felly rim as having mounted in channel (14) thereof a locking ring (28) engaging and supporting bead (29) on a clencher type of rim (30). This structure is provided for the individual clencher bead type of tire. In Fig. 6. the demountable rim (30) is provided with straight side beads (31) for the individual straight side type of tire.

Referring to Fig. 7. of the drawings, the diagram as illustrated shows a standard roller bearing hub (32) for either the front or rear wheel types of construction, the rear shell portion of said hub having formed integrally therewith a circular flange (33) adapted to receive two series of spokes, the outer end of said hub (32) flaring outwardly as at (34) and provided with means adapted to receive a hub cap (35). The diagonally inclined portion (34) of hub (32) receives the two remaining series of spokes. The right angle or vertical series of spokes H. takes care of the vertical thrust on the wheel and assists the driving spokes in taking care of the weight of the suspension of the body to which the wheel is applied, and is indicated by the line $o$—$o$, the series of spokes G. takes care of the outward transverse thrust, assisting series of spokes H. and are mounted in flange (33) at a point substantially at a right angle to the periphery of flange (33) and is represented by the line $n$—$n$. Series of spokes B. extend from the front of the hub to the back of the rim and is represented by the line $m$—$m$ and crosses the rim center tread line at $x$—$x$ by $y$—$y$. Said series of spokes B. taking care of the inward transverse thrust and assists series of spokes G., and the series of spokes A. takes care of the bearing sustaining means and assists all of the aforementioned spokes and is represented by the line $l$—$l$ and extends from the front of the hub to the front of the rim. Series of spokes (8) are mounted in the rim and hub at a right angle to the axis of said hub, series of spokes G. are mounted with respect to the rim and hub on an obtuse angle. The exact tangential inclination of said series of spokes being had by the distance of suspension between the outer periphery of the hub flange (33) and the felly rim of the wheel, the strength of the wheel at this point being maintained by the increase of the diameter of the flange (33). Series of spokes H. are mounted from the rear of the hub to the rear of the rim and said series of spokes G. are mounted from the rear of the hub to approximately the front of the rim. Series of spokes B. are mounted at an acute angle to the axis of the hub, and are so placed with relation to said rim and hub that the tangential inclination of the same is substantially opposite the obtuse angle series of spokes G., the point where said oppositely opposed spokes cross each other being substantially on the tread center line of the wheel. Said series of spokes B. are mounted in the front of the hub and extend to the back of the rim in alinement at said point with the series of spokes H. Series of spokes A. are mounted in said hub and rim at an acute angle at a lesser degree than the series of spokes B. and this series of spokes takes care of the outward transverse thrust on the wheel, assisting both of the series of spokes G. and B., said series of spokes A. being mounted in the front of said hub and extending to approximately the front of the rim in the same alinement at that point with the series of spokes G. By stringing a series of spokes under tension between a hub and rim, and by segregating said spokes into four independent series, arranging them so that at the rim point two of each series are in alinement with each oppositely opposed series, and by mounting each of said four series in four separate lines of contact with the hub structure a four point suspension wheel is had, thereby providing a wheel of this type, far superior in its weight, strength and driving power sustaining means.

It is obvious that the device herein shown and described may be varied in its structural form and features without departing from the spirit of the invention.

What we claim and desire to secure by Letters Patent of the United States, is:

1. A device of the character described including a vehicle wheel comprising a rim provided with nonbolted-on locking means for an auxiliary or demountable rim, a hub and four series of spokes connecting said rim and hub, one series extending from the back of the hub to the back of the rim, another series extending from the back of the hub to the front of the rim, another series extending from the front of the hub to the back of the rim, and a fourth series extending from the front of the hub to the front of the rim, three of said series being angularly disposed relative to the central plane of the wheel and the other series being approximately parallel with said plane, the central plane of the rim and the central plane of rotation of the hub being removed from one another.

2. A device of the character described including a vehicle wheel comprising a rim provided with nonbolted-on locking means for an auxiliary or demountable rim, a hub and four series of spokes connecting said rim and hub, one series extending from the back of the hub to the back of the rim, another series extending from the back of the hub to the front of the rim, another series extending from the front of the hub to the back of the rim, and a fourth series extending from the front of the hub to the front of the rim, three of said series being angularly disposed relative to the central plane of the wheel and the other series being approximately parallel with said plane, the central plane of the rim and the central plane of rotation of the hub being removed from one another, two of said series of spokes being arranged so as to cross one another on the plane of the tread center of the wheel.

3. A device of the character described including a vehicle wheel comprising a rim provided with nonbolted-on locking means for an auxiliary or demountable rim, a hub and four series of spokes connecting said rim and hub, one series extending from the back of the hub to the back of the rim, another series extending from the back of the hub to the front of the rim, another series extending from the front of the hub to the back of the rim, and a fourth series extending from the front of the hub to the front of the rim, three of said series being angularly disposed relative to the central plane of the wheel and the other series being approximately parallel with said plane, the central plane of the rim and the central plane of rotation of the hub being removed from one another, two of said series of spokes being arranged so as to cross one another on the plane of the tread center of the wheel, said four series of spokes being mounted in two separate lines of contact in said rim and four separate lines of contact in said hub.

4. A device of the character described comprising an integral shell hub having formed therewith a supporting flange at its inner end, and at its outer end an enlarged shell and driving head, and four series of spokes connecting said rim and hub, two of said series being mounted in said supporting flange and two of said series being mounted in said enlarged supporting shell, all of said series of spokes being mounted in two lines of contact on said rim and four lines of contact on said hub, two of said series of spokes crossing each other at or near the plane or tread center of the wheel.

In testimony whereof we have hereto signed our names in the presence of two subscribing witnesses.

ROBERT W. ASHLEY.
FRANK OBERKIRCH.

Witnesses:
  E. E. HAINES,
  A. DELATOS.